United States Patent [19]

Fike et al.

[11] Patent Number: 4,738,604
[45] Date of Patent: * Apr. 19, 1988

[54] TUBELESS TIRE CURING APPARATUS

[75] Inventors: Louis T. Fike, Hacienda Heights; Kenneth A. Green, Ontario, both of Calif.

[73] Assignee: Ohio Machine Company, Inc., Los Angeles, Calif.

[*] Notice: The portion of the term of this patent subsequent to Jul. 16, 2002 has been disclaimed.

[21] Appl. No.: 208,392

[22] Filed: Nov. 19, 1980

Related U.S. Application Data

[63] Continuation of Ser. No. 84,646, Oct. 15, 1979, abandoned, which is a continuation-in-part of Ser. No. 903,900, May 8, 1978, abandoned.

[51] Int. Cl.[4] .............................................. B29C 35/00
[52] U.S. Cl. ........................................ 425/36; 156/96; 156/414; 157/13; 425/44
[58] Field of Search ................ 425/17, 21, 36, 44; 157/13–21; 100/257; 156/414, 96

[56] References Cited

U.S. PATENT DOCUMENTS

| | | | |
|---|---|---|---|
| 2,040,325 | 5/1936 | Haller | 425/78 |
| 2,077,506 | 4/1937 | Woock | 425/17 |
| 2,480,578 | 8/1949 | Hodges | 425/17 |
| 2,762,078 | 9/1956 | Haller | 425/78 |
| 2,825,092 | 3/1958 | Hatch et al. | 425/78 |
| 2,835,921 | 5/1958 | White | 425/22 |
| 2,866,228 | 12/1958 | French | 425/19 |
| 3,133,317 | 5/1964 | Branick | 425/17 |
| 3,135,996 | 6/1964 | Smyser | 425/24 |
| 3,149,375 | 9/1964 | Giehl | 425/78 |
| 3,168,759 | 2/1965 | Johannigman | 425/78 |
| 3,184,794 | 5/1965 | Sherkin | 425/19 |
| 3,195,179 | 7/1965 | Laube | 425/36 |
| 3,310,838 | 3/1967 | Jornsen | 425/17 |
| 3,331,412 | 7/1967 | Jornsen | 425/21 |
| 3,593,764 | 7/1971 | Smith | 425/17 |
| 3,614,969 | 10/1971 | Breiner | 425/17 |
| 3,690,794 | 9/1972 | Shallbarger | 425/21 |
| 3,771,930 | 11/1973 | Grinzel et al. | 100/257 X |
| 4,022,554 | 5/1977 | MacMillan | 425/36 |

Primary Examiner—Willard E. Hoag
Attorney, Agent, or Firm—Fulwider, Patton, Rieber, Lee & Utecht

[57] ABSTRACT

Tubeless tire curing rim apparatus having rim bodies which telescope together under spring pressure to form an initial seal between a tire bead and sealing rim flanges on the rim bodies and which telescope apart as the tire is inflated to form the conventional bead rim seal. The bead-to-bead spacing for the tire is adjustable by means of calibrated threaded rings on the rim bodies or by a means of calibrated threaded central column.

9 Claims, 6 Drawing Sheets

TUBELESS TIRE CURING APPARATUS

CROSS-REFERENCE TO RELATED APPLICATION

This is a continuation of application Ser. No. 084,646, filed Oct. 15, 1979 and a continuation-in-part of application Ser. No. 903,900 filed May 8, 1978, both now abandoned.

BACKGROUND OF THE INVENTION

1. Field of the Invention:

The present invention relates generally to curing rims for tires and, more particularly, to tubeless curing rim apparatus adapted to accomodate a plurality of bead-to-bead spacings for tires.

2. Description of the Prior Art:

Retreading a tire typically involves placing an inflatable rubber tube within the tire, covering the tube with a flap and mounting the tire on a curing rim before inserting the tire into a mold or "matrix". The tire is then inflated to a relatively high pressure and cured within the matrix to shape the rubber and bind it to the tire body. Insertion of the innertube and flap and mounting the tire on a fixed rim is a laborious task which is time consuming and expensive. Additionally, a rim with separate loose spacers must be provided for tires being retreaded because the required bead-to-bead spacing for tires of the same size are different.

With the advent of tubeless tires for large vehicles such as trucks and earth moving equipment, the continued necessity of utilizing a tube within the tire in order to inflate the tire is particularly expensive and time consuming. Additionally, tubes and flaps are becoming scarce. Thus, there has long been a need for a practical curing rim for tire retreading processes which would permit the tire to be inflated without a tube and which accomodates a plurality of bead spacings, eliminating the necessity for maintaining and handling large varieties of rim spacers and providing a means of obtaining the initial seal directly after the mold is closed when the beads of the tire are closest together. The present invention satisfies that need.

SUMMARY OF THE INVENTION

The tire curing apparatus of the present invention provides means by which tires may be cured without the necessity of inserting an inflatable innertube and/or a flap to maintain the relatively high pressures utilized in the curing process. Additionally, the apparatus embodying the present invention provides adjustable bead-to-bead spacing for the tire so that a single curing apparatus may be utilized for a number of different bead widths of tires thereby effecting important cost savings.

Tire curing apparatus embodying the present invention utilizes a dual step bead seal technique effected by first telescoping two sealing rim flanges together under spring pressure so that such flanges engage the beads of the tire and then axially separating such flanges under tire inflation pressure until predetermined stops are reached which set the bead-to-bead spacing selected for a given tire.

The stops are provided either by means of adjustable spacer rings which thread into the rim sections to calibrated positions, or by a calibrated threaded central column between the rim bodies. The sealing rim flanges are either integrally formed on the rim bodies or are axially slidably carried by the rim bodies.

An important object of the present invention is to provide tubeless tire curing apparatus of the aforedescribed nature which is foolproof in operation even when operated by comparatively unskilled labor.

Another object is to provide tubeless tire curing apparatus which is simple in design and rugged of construction whereby it may afford a long and useful service life.

These and other objects and advantages of the present invention will become apparent from the following detailed description when taken in conjunction with the appended drawings.

DESCRIPTION OF PREFERRED EMBODIMENTS

Figures 1, 4, 5, 5A:
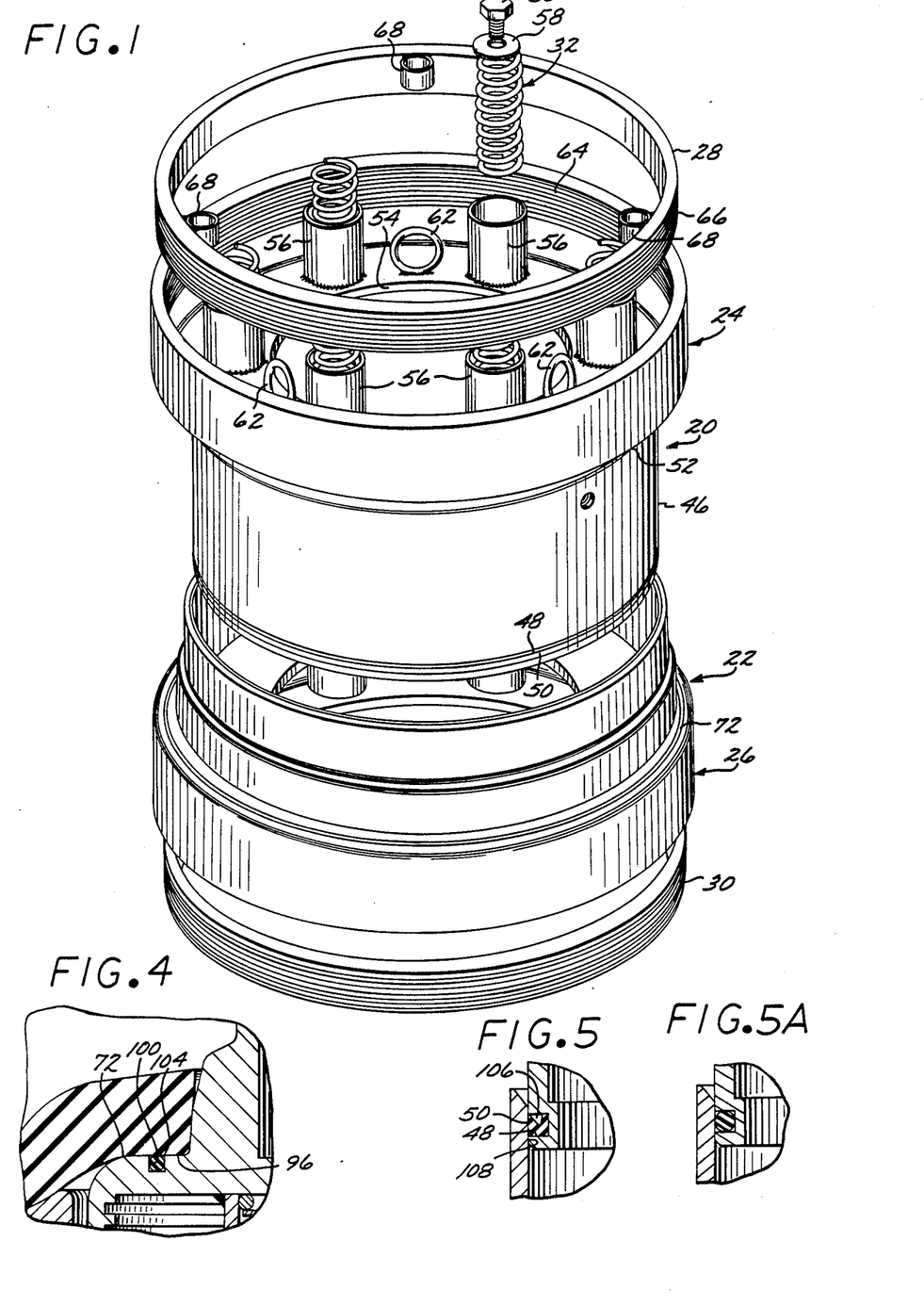
FIG. 1 is an exploded perspective view of a first embodiment of tubeless tire curing apparatus embodying the present invention.
FIG. 4 is a fragmentary sectional view of the sealing rim arrangement utilized on the apparatus of FIGS. 1, 2 and 3.
FIG. 5 is a fragmentary sectional view of a first form of seal between the telescoping rim bodies of the apparatus of FIGS. 1, 2 and 3.
FIG. 5(A) is a view similar to FIG. 5 but showing a second form of seal between the telescoping rim bodies.
Figure 2:
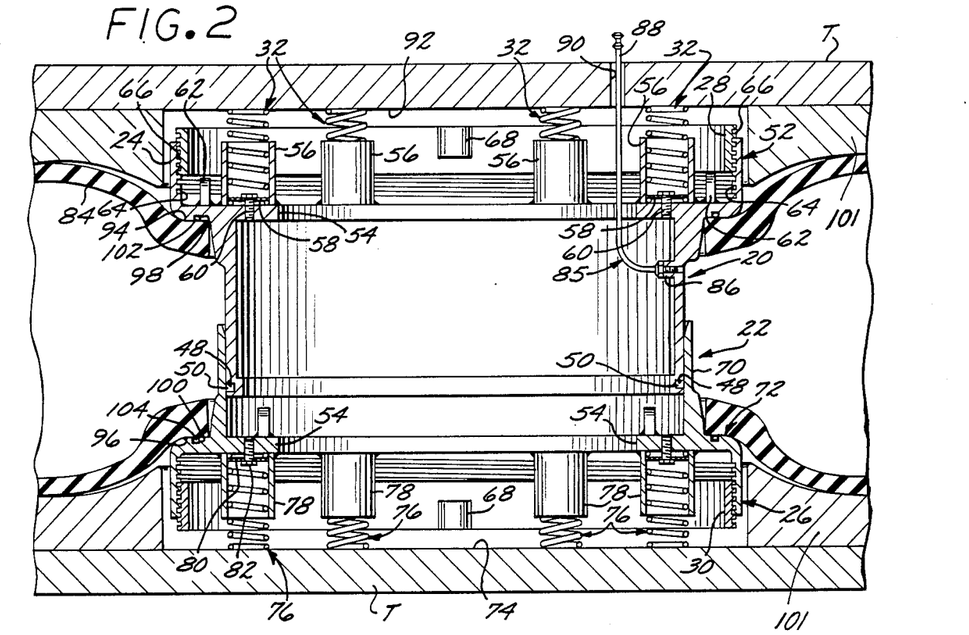
FIG. 2 is a broken vertical sectional view of said tire curing apparatus prior to inflation of a tire to be retreaded.
Figure 3:
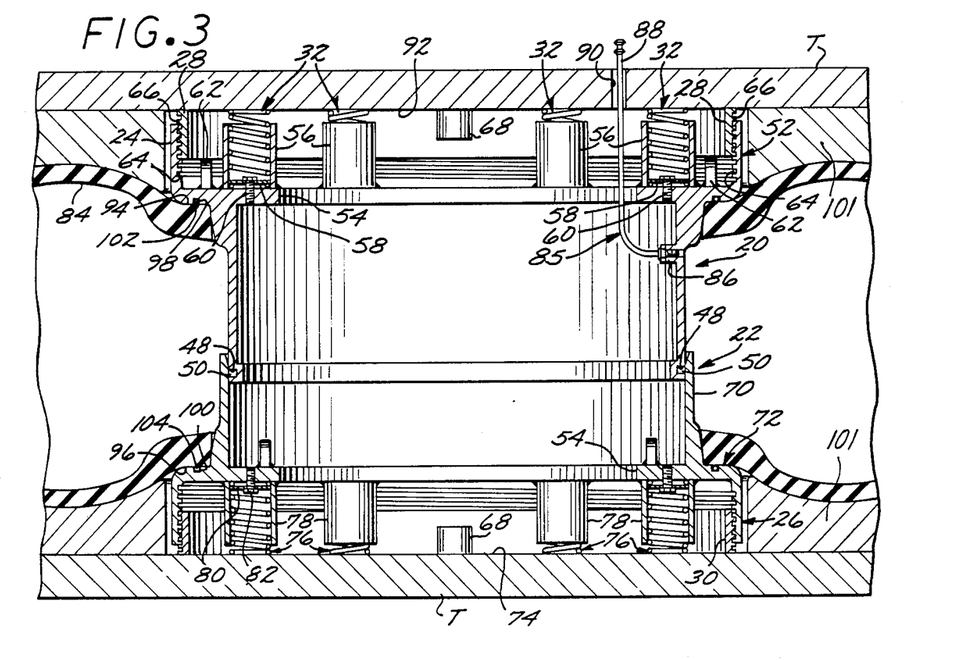
FIG. 3 is a view of the tire curing apparatus similar to FIG. 2, but shown with the tire inflated.

Referring to the drawings, particularly FIGS. 1, 2 and 3 thereof, a first embodiment of tire curing apparatus embodying the present invention basically includes generally cylindrical upper and lower telescoping rim bodies 20 and 22, respectively, which on their outer extremities are formed with integral adjustment cylinders 24, respectively, adapted to receive threaded adjustable spacer rings 28 and 30 to adjust tire bead spacing as will be more fully described hereinafter. The rim bodies 20 and 22 are yieldingly urged together by means of a plurality of coil compression springs, generally designated 32, which push against the platens of a frame such as a tire curing mold table T as described hereinafter.

More particularly, referring to the first embodiment of tubeless tire curing apparatus embodying the present invention illustrated in FIGS. 1-5, rim body 20, designated for the purposes of description as the upper rim body 20, includes a cylindrical telescoping skirt 46 which on its lower end is formed with an annular groove 48 in which is mounted a section seal 50 described in more detail hereinafter (FIG. 5). On the upper end of the telescoping skirt 46 is formed a radially outwardly extending sealing rim flange, generally designated 52. Inwardly of the sealing rim flange 52 is an annular spring mounting wall 54 which is best illustrated in FIGS. 2 and 3.

Equidistantly spaced around the spring mounting wall 54 and welded thereto are six tubular spring support cups 56 in which are vertically mounted the springs 32, the springs being held in place within the cups 56 by means of retaining washers 58 and screws 60, as shown in FIGS. 2 and 3. Also welded in place on the spring mounting wall 54 are three lifting eyelets 62 for handling the upper rim body 20. The adjustment cylinder 24 has inside threads 64 which are adapted to receive the upper adjusting spacer ring 28 which is externally threaded at 66. The spacer ring includes three adjusting lugs 68 welded at equidistant spacing around the inside surface of the ring. Rim body 22, designated as the lower rim section for the purposes of description, is substantially identical to the upper rim body 20 in basic structure, but is inverted relative thereto and includes a telescoping skirt 70 of slightly larger diameter than telescoping section 46 whereby skirt 70 is adapted to telescopingly receive upper skirt 46. The lower rim body also includes a radially outwardly extending, integral sealing rim flange 72, generally corresponding to upper sealing rim flange 52.

The utilization and operation of the tubeless curing apparatus of the present invention is best illustrated in FIGS. 2 and 3. Initially, the spacer ring 30 of the lower rim body 22 is threaded into the adjustment cylinder 26 to a predetermined depth for the particular bead-width spacing desired. Such depth may be determined as a function of the characteristics of the tire to be cured and the dimensions of the tire sold. The lower rim body 22 is then placed, springs down, on a horizontal surface which, for the purposes of description, will be designated as a lower platen 74 of a conventional curing table T, as shown in FIGS. 2 and 3. In this position, the spacer ring 30 is held above the platen 74 by means of the springs 76 which are mounted in the cups 78 and retained by retaining washers 80 and screws 82.

A tire 84 to be retreaded is then positioned over the lower rim body 22 and the upper rim body 20 is disposed over the tire 84 in telescopic relationship with the lower rim body 22, the tire beads encircling skirts 46 and 70. As with the lower rim body 22, upper spacer ring 28 has been threaded into adjustment cylinder 24 to a predetermined depth by relative rotation thereof with respect to said cylinder. A conventional air inlet assembly 85, including an air stem 86 and an inlet tube 88 provided for inflation of tire 84 extends through an aperture 90 in an upper platen 92 of the curing table T.

When the upper and lower platens 92 and 74 of the curing table T are disposed in operating position, the springs 32 and 76 are in compression and telescope together the upper and lower rim bodies 20 and 22 to thereby urge the upper and lower sealing rim flanges 52 and 72 toward each other and into contact with beads 94 and 96, respectively, of the tire 84. It should be appreciated that in this position, initial sealing action between the flanges 52 and 72 and beads 94 and 96 is effected. To assist in effecting such initial seal there may be provided annular grooves 98 and 100 in the upper and lower sealing rims, respectively, in which are mounted G-rings 102 and 104, best illustrated in FIG. 4. Thus, the tire 84 may then be inflated with the first sealing means providing a positive air seal during the initial phase of the inflation cycle. As the tire 84 is further inflated, the upper and lower rim bodies 20 and 22 telescope apart a substantially equal distance until stop positions defined by the spacer rings 28 and 30 are reached, as shown in FIG. 3, whereby tire 84 will remain centered horizontally relative to the molds 101 of curing table T. The beads 94 and 96 of the tire at this time effect a secondary positive sealing contact with the sealing rim flanges 52 and 72, respectively, due to the resistance of the tire beads against spreading. The stop positions set by the spacer rings 28 and 30 are so selected that the bead-to-bead spacing is correct for the dimensions of the particular tire being cured. Also, the tire 84 will be centered relative to the upper and lower halves of the tire sold. Curing of the tire may be effected in a conventional manner. After the tire is cured the air pressure therewithin is released and the tire can be removed from the tire curing apparatus by a reversal of the tire mounting operation.

Referring to FIG. 5, the section seal 50 mounted in the circumferential groove 48 formed in the lower end of the skirt 46 of the upper rim body 20 is essentially a "frictionless" seal in that in the absence of air pressure within the tire 84, the seal 50 is relaxed and the upper rim section 20 may be inserted into the lower rim section 22 with no impediment. Section seal 50 is seen to be generally U-shaped in configuration, the open portion facing facing upwardly so that air pressure within the tire 84 may enter the open section 106 to expand that U-shaped section into contact with the side wall 108 of the lower rim body 22 and make sealing contact therewith as the upper and lower rim bodies move apart. Referring now to FIG. 5(A), a conventional O-ring seal 50A may be utilized in place of section seal 50.

Figure 6:
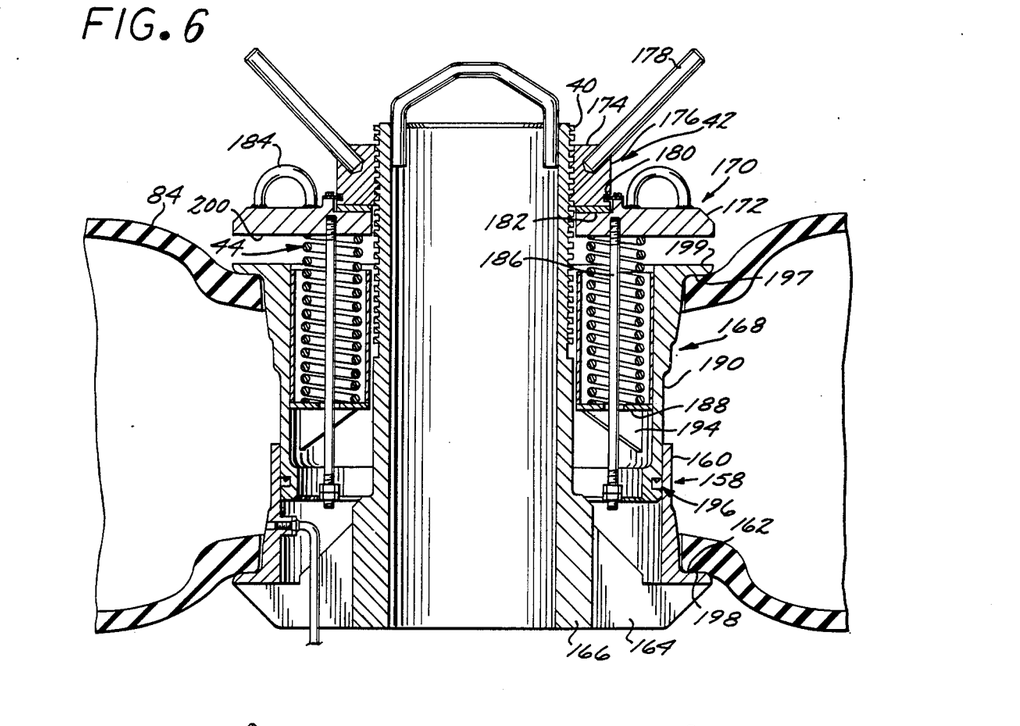
FIG. 6 is a broken vertical sectional view of a second embodiment of tire curing apparatus embodying the present invention shown prior to inflation with a tire to be retreaded in place therewithin.
Figure 7:
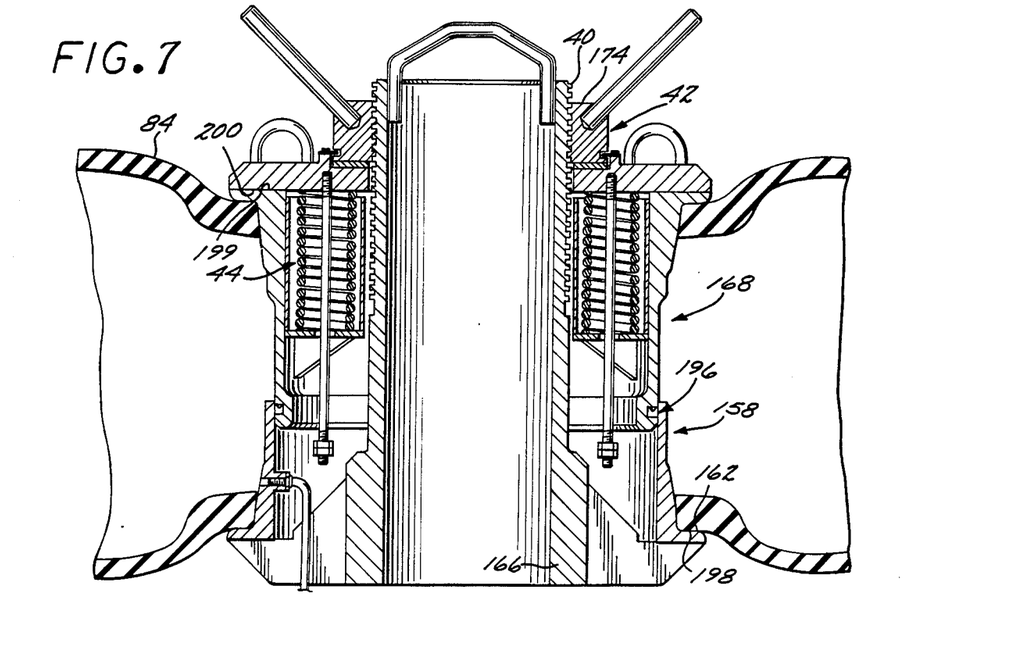
FIG. 7 is a view similar to FIG. 6, but with the tire inflated.

FIGS. 6 and 7 illustrate a second embodiment of tubeless tire curing apparatus embodying the present invention. This embodiment is designed to be utilized in a curing unit having an open center so that the entire curing rim apparatus, including the adjusting stops must be assembled as an integral unit since there are no table platens above and below the tire holding apparatus against which springs may push. Therefore, in the second embodiment of the invention, an integral lower rim body 158 including an upwardly extending tubular skirt 160 and a sealing rim 162 is integrally attached by means of connecting ribs 164 to a central support column 166 which extends upwardly to engage a combined upper rim body 168 and a reference plane-defining plate assembly 170.

The plate assembly 170 includes a horizontal circular plate 172 on which is rotatably attached a wing nut 174 having an internally threaded body 176 and outwardly and upwardly extending manipulating rods 178. A retainer 180 is interposed between body 176 and plate 172. Wing nut 176 exerts a downward force on the plate 172 through a bushing 182. The plate 172 includes lifting eyelets 184. Depending from plate 172 are tie rods 186 which extend through an apertured pad 188 welded to the inside wall of skirt 190 of the upper rim body 168. The pad 198 is supported by means of a bracket 194, and an open cylinder 195 extends upwardly from pad 188 to house springs 44. A section seal unit 196 which may be similar to section seal unit body of FIGS. 5 or 5A is interposed between skirts 160 and 190. Upper rim 168 is formed with a curved sealing rim flange 197 to engage the upper bead of tire 84, and the lower rim section is formed with a similar sealing rim flange 198. O-rings similar to O-rings 102 and 104 of FIGS. 2 and 3, may be utilized on sealing rim flanges 197 and 198, respectively, if desired. However, in some instances, such seals may not be required.

Figure 8:
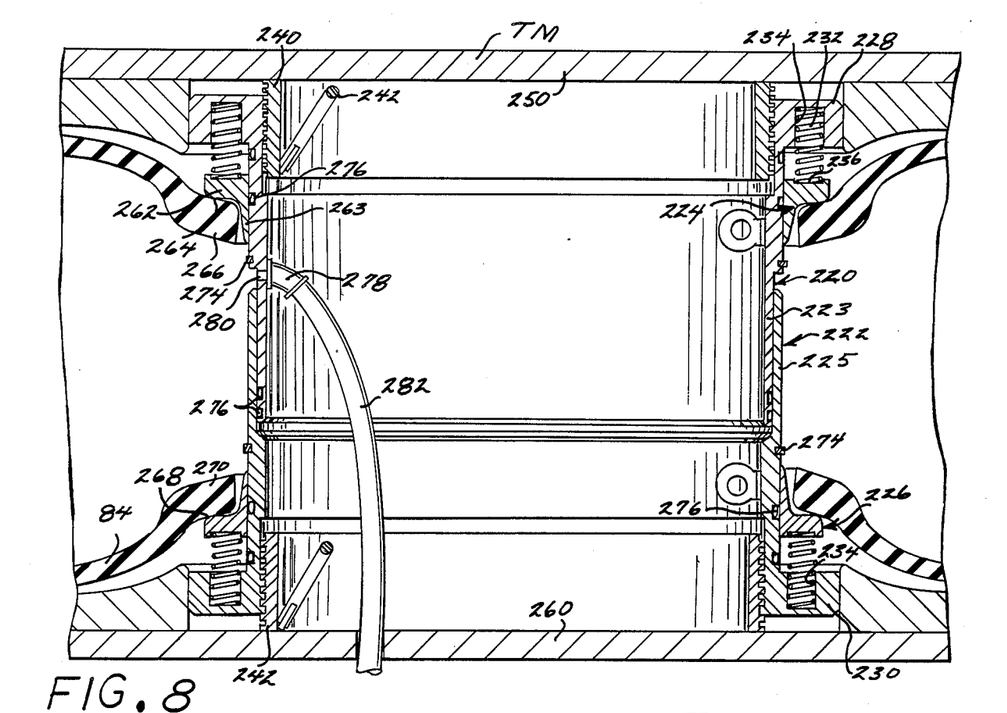
FIG. 8 is a broken vertical sectional view of a third embodiment of tire curing apparatus embodying the present invention shown with a tire to be retreaded in place prior to inflation.

In this embodiment, the tire 84 to be retreaded may be first positioned over the column 166 and lower rim body 158 and then the entire upper rim body and reference plate 172 section may be placed over the tire. Wing nut 174 is then rotated so as to move downwardly over the column 166 to a predetermined depth to provide the proper bead-to-bead spacing for tire 84. Springs 44 will then have compressed sufficiently to exert a downward force against pad 188, upper spring section 168 and sealing rim flange 197 to effect the initial seal with the upper tire bead, as discussed hereinabove. Simultaneously, the lower sealing rim flange 198 will effect an initial seal with the lower tire bead. The entire apparatus shown in FIGS. 6 and 7 is then positioned within a conventional curing table (not shown) and centered with respect to the tire molds of such table. The tire 84 is then inflated, at which time upper skirt 190 is urged upwardly against the force of springs 44 until the upper surface 199 of upper rim body 168 engages reference surface 200 of the plate 172, as shown in FIG. 8. The upper and lower rim bodies telescope apart a substantially equal distance during such inflation.

Curing of the tire 84 may be then be effected in a conventional manner. After the tire is cured the air pressure therewithin is released and the wing nut 174 is backed off to permit removal of plate 172 and the elements attached thereto. The cured tire can the be removed from the tire curing apparatus.

Referring now to FIGS. 8 through 11, there is shown a third embodiment of tire curing apparatus embodying the present invention. Such apparatus includes upper and lower rim bodies 220 and 222, respectively, having skirts 223 and 225 which axially slidably support at their upper and lower ends respectively, upper and lower sealing rim flanges, generally designated 224 and 226. The upper and lower extremities of upper and lower rim bodies 220 and 224 are provided with integral top and bottom radially outwardly extending collars 228 and 230. A plurality of circumferentially-spaced like coil compression springs 232 are interposed between spring cavities 234 formed in the top and bottom collars 238 and 230, and annular cavities 236 formed in the upper and lower surfaces respectively of the sealing rim flanges 224 and 226. Upper and lower spacer rings 240 and 242 respectively, are threadably mounted within the internally threaded upper and lower portions of the upper and lower rim bodies 220 and 222. These spacer rings are each provided with circumferentially spaced lifting rings 242. The spacing of springs 232 is shown particularly in FIG. 10.

The above-mentioned parts are disposed within the platens of a frame such as a tire curing mold table TM similar to that shown in FIGS. 2 and 3. Specifically, the upper surface of upper spacer ring 240 abuts the underside of the upper platen 250 of table TM, while the underside of the lower spacer ring 242 abuts the upper surface of lower platen 260 of curing table TM.

Figure 9:
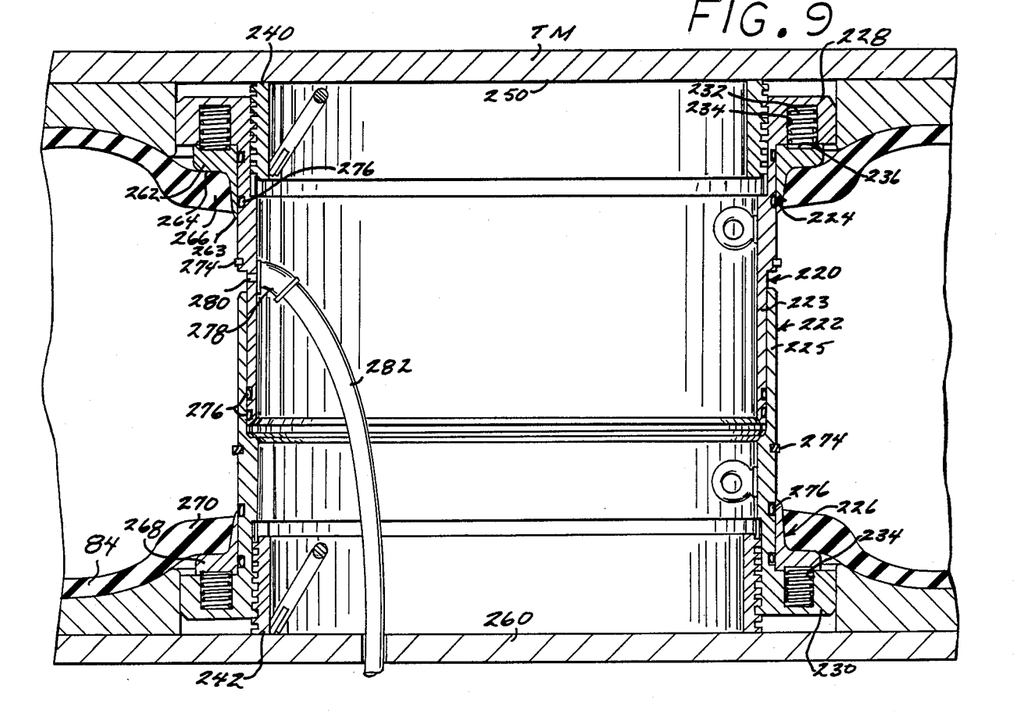
FIG. 9 is a view similar to FIG. 8 with the tire inflated.
Figure 10:
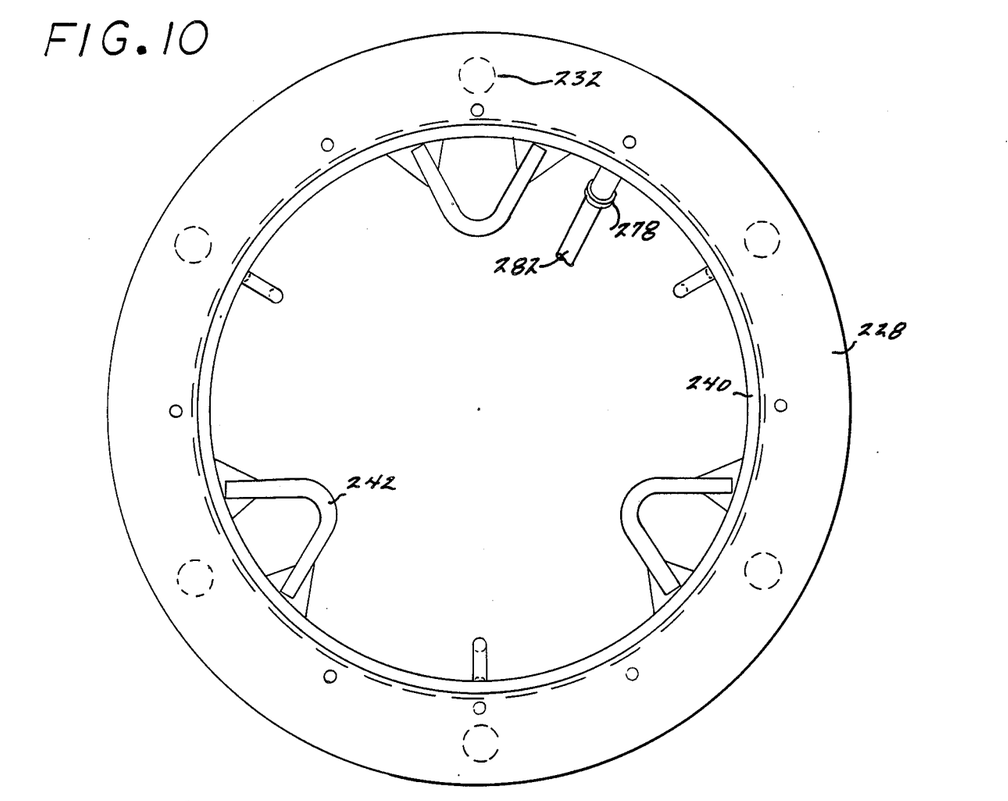
FIG. 10 is a top plan view in enlarged scale of the apparatus of FIGS. 8 and 9.
Figure 11:
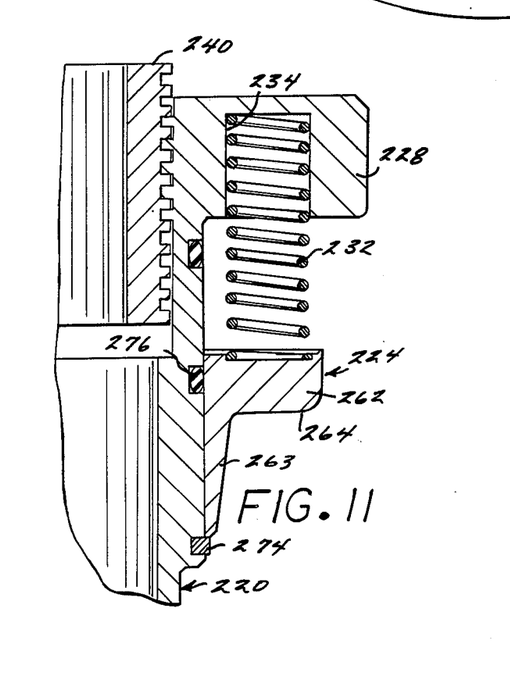
FIG. 11 is a broken vertical sectional view in enlarged scale of the sealing rim support and sealing rim flange of the apparatus of FIGS. 8 and 9.

Upper sealing rim flange 224 includes a horizontal shoulder 262 which is integrally formed at its radially inner portion with a downwardly extending lip 263 that has a snug but sliding fit with upper rim body 220. The underside of shoulder 262 is formed with a curved sealing surface 264 that engages the upper bead 266 of a tire 84 to be retreaded. Lower sealing rim flange 226 is similar in construction to the upper sealing rim flange 224, with the exception that it is a mirror image thereof. It is important to note that such lower sealing rim flange 226 is provided with a curved sealing surface 268 that engages the lower bead 270 of tire 84 to be retreaded.

Vertical movement of the sealing rim flanges 224 and 226 towards one another is limited by stop rings 274 fitted within the outer peripheries of the upper and lower rim bodies 220 and 222. The rim bodies are also provided with complementary circumferential seals 276 for sealing the interior of the tire 84, with respect to the interior of such rim bodies when the tire is inflated. Such seals may be of the O-ring type. An air supply fitting 278 is affixed to the interior of the upper rim body 220 and is connected to the space encompassed by the tire 84 by means of a passage 280 formed in such rim body. The air fitting 278 is connected to an air hose 282 that extends through the lower platen 260 to a source of compressed air or other fluid.

In the operation of the apparatus shown in FIGS. 8-11, the upper and lower spacer rings 240 and 242 are first threaded into their respective upper and lower rim bodies to a predetermined depth for the particular bead-width spacing desired. To this end, the spacer rings may be provided with markings (not shown) corresponding to the desired bead-width spacing desired. The tire 84 to be retreaded is positioned in a conventional manner with its beads 266 and 270 abutting the sealing surfaces 264 and 268 of the upper and lower sealing rim flanges 224 and 226. The rim apparatus and its tire are then disposed within the curing table TM. At this time, the springs 232 and 234 are in compression and urge the upper and lower sealing rim flanges 224 and 226 into contact with the tire beads 266 and 270. In this position, initial sealing between the sealing surfaces 264 and 268 and tire beads 266 and 270 is effected. The tire 84 may then be inflated, with the aforementioned contact between the sealing surfaces and the tire beads, providing a positive air seal during the initial phase of the tire inflation cycle. As the tire 84 is further inflated, the upper and lower sealing rim flanges 224 and 226 telescope apart a substantially equal distance until reaching their stop positions defined by the upper and lower surfaces of the top and bottom flanges 228 and 230 of the rim bodies. During such movement the tire beads 266 and 270 effect a secondary positive sealing contact with the sealing rim flanges 224 and 226 due to the resistance of the tire beads against spreading. The parts of the rim apparatus are then disposed as shown in FIG. 9, wherein curing of the tire 84 may be effected. After the tire is cured the air pressure there within is released and the tire can be removed from the apparatus in a conventional manner.

Figure 12:
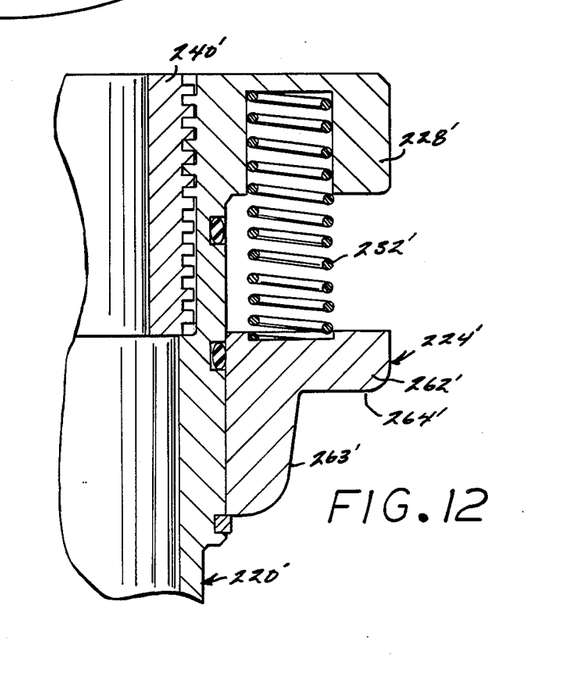
FIG. 12 is a view similar to FIG. 11, but showing a modified sealing rim flange.

Referring now to FIG. 12, there is shown a modified sealing rim flange 224' which may be employed with the apparatus of FIGS. 8-11. A comparison between FIG. 11, wherein the normal sealing rim flange 224 is disclosed, and FIG. 12 indicates that the sealing rim flange 224' provides for the curing of a larger tire than the curing rim 224. This result is achieved by increasing the thickness of the lip 264' and decreasing the depth of the horizontal shoulder 262'. With continued reference to FIG. 12, it will be noted that spacer ring 240 has been threaded downwardly within the upper rim body 220 so as to increase the bead-width spacing, with respect to a tire to be cured.

Figure 13:
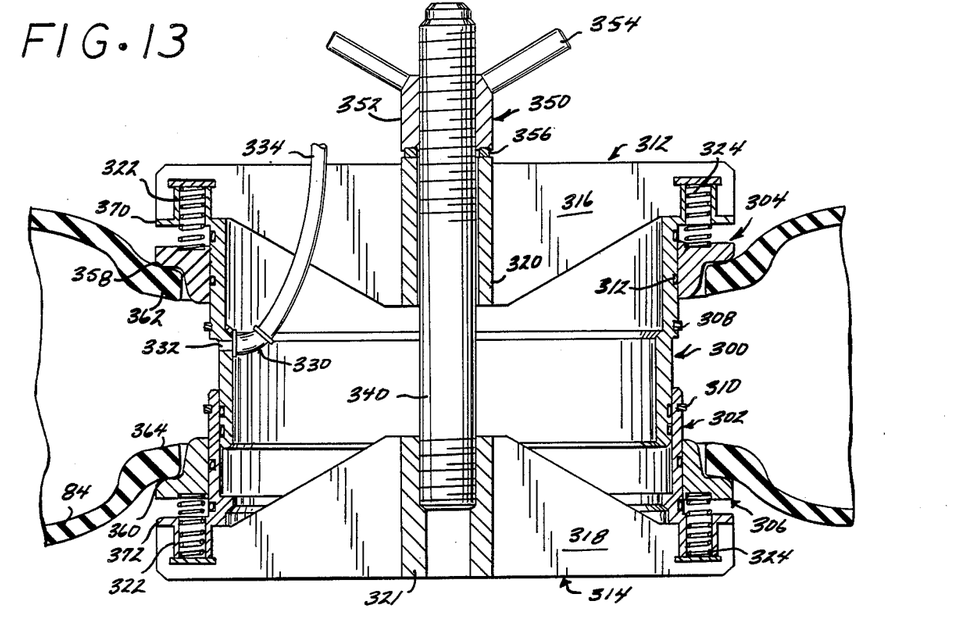
FIG. 13 is a broken vertical sectional view of a fourth embodiment of tire curing apparatus embodying the present invention shown prior to inflation with a tire to be retreaded in place therein.
Figure 14:
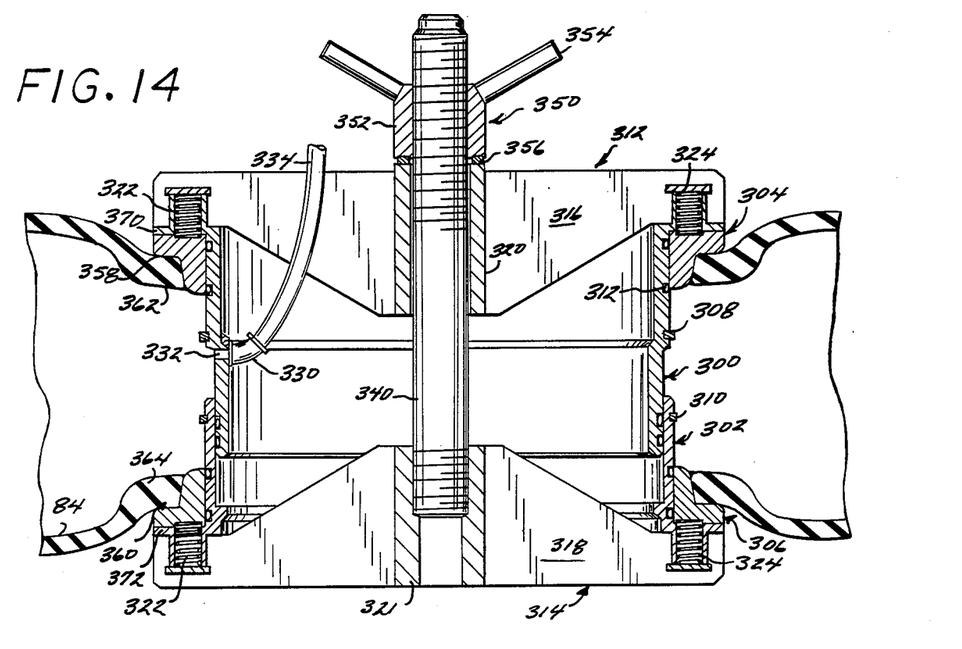
FIG. 14 is a view similar to FIG. 13 but with the tire inflated.

FIGS. 13 & 14 illustrate a fourth embodiment of tubeless tire curing rim apparatus embodying the present invention. Such fourth embodiment is generally similar to the embodiment shown in FIGS. 6 and 7, with the exception that it utilizes the floating sealing rim flange arrangement of the apparatus shown in FIGS. 8-11. Thus, this embodiment includes telescoping upper and lower rim bodies 300 and 302 having telescoping skirt portions 300a and 302a that axially, slidably carry upper and lower sealing rim flanges 304 and 306, respectively. The upper and lower rim bodies support annular stops 308 and 310 for the upper and lower sealing rim flanges, and a plurality of like seal means 312 for sealing the interior of a tire 84 to be cured with respect to the interior of such rim bodies. The upper portion of upper rim body 300, is rigidly secured to an upper spider frame, generally designated 312, while the lower rim body 302 is affixed to a similar spider frame 314.

Spider frames 312 and 314 include horizontally extending plates 316 and 318. It will be understood that a plurality of such plates are provided, each of such plates extending radially outwardly from upper and lower center sleeves 320 and 321. The radially outer portions of the plates 360 are provided with cups 322 of like construction, each of which houses a coil compression spring 324. Such coil compression springs 322 extend vertically downwardly from the upper spider 312 and upwardly from lower spider 314. Springs 322 have their opposite ends abutting the upper and lower sealing rim flanges 304 and 306, respectively. An air fitting 330 is affixed to the upper rim body 300 adjacent an air passage 332 formed in such rim body. The air supply fitting is connected to an air hose 334, which extends upwardly through the upper spider 312 to a source of compressed air or other fluid (not shown).

The center sleeves 320 and 321 of the upper and lower spiders 316 and 318 receive a support column 340, which extends upwardly to receive a wing nut 350 having an internally threaded body 352 and outwardly upwardly extending manipulating rods 354. A bushing 356 is interposed between the upper end of sleeve 320 and wing nut body 352. The lower end of support column 340 is threadably secured within the lower sleeve 321, while the intermediate portion of such support column is axially slidable with respect to the upper sleeve 320.

In this embodiment of the invention, the wing nut 350 is rotated so as to move the upper spider 316 downwardly with respect to column 340 to a predetermined position calibrated to provide the proper bead-to-bead spacing of the tire 84 to be cured. As with the previously described embodiments of the apparatus, the springs 322 will cooperate with the curved sealing surfaces 358 and 360 of flanges 304 and 306 to effect an initial seal with the tire beads 362 and 364. As the tire 84 is inflated, the parts of the apparatus will move from their positions of FIG. 13 to those of FIG. 14. It will be observed that as the tire is inflated, the tire beads will effect vertical movement of the upper and lower sealing rim flanges 304 and 306 apart from one another a substantially equal distance until the flanges about the lower and upper surfaces of plane-defining collars 370 and 372 affixed to the upper and lower spiders 312 and 314, as shown in FIG. 14. It will be understood that the rim apparatue of FIGS. 13 and 14 is utilized with conventional tire mold apparatus of the general type shown in the preceeding figures of the drawing.

Each embodiment of the present invention provides for an initial seal which is effected by means of telescoping sealing rim flanges urged into the first seal position by spring force, with the subsequent inflation of the tire resulting in the springs being compressed until a stop position is reached which defines the desired bead width spacing for the particular tire being cured. In the stop position, an effective bead-to-metal seal is provided which withstands relatively high pressures. The tire curing operation may be accomplished in a minimim time and with a considerable reduction in labor as compared to existing tire curing arrangements.

It will be understood that various modifications and changes may be made with respect to the foregoing detailed description without departing from the spirit of the present invention.

We claim:

1. Apparatus usable within a tire mold for curing tubeless tires having varying bead-to-bead spacing, said apparatus comprising:

a frame;

upper and lower rim bodies associated with said frame having telescoping tubular skirt portions adapted to be axially movable relative to the upper and lower ends of said frame, a tire to be cured having the radially inner ends of its beads resting upon said skirt portions and with the space separating said beads being open;

upper and lower sealing rim flanges vertically slidably supported respectively upon said upper and lower rim bodies for sealing engagement with the beads of the tire to be cured;

collar means on said rim bodies that limit the vertical movement of said sealing rim flanges on said rim bodies;

spring means associated with said sealing rim flanges to urge said flanges axially towards one another and into contact with said tire beads to thereby effect an initial sealing action between said flanges and said tire beads solely by means of the contact provided by the initial force of said spring means;

air supply means extending through one of said rim bodies for inflating said tire whereby the beads thereof effect relative axial separation of said rim bodies against the force of said spring means, with solely the resistance of the beads against separating continuing to maintain a seal between said beads and said sealing rim flanges;

seal means on said rim bodies for sealing the interior of said tire with respect to the interior of said rim bodies when said tire is inflated; and adjustable spacer means interposed between said frame and each of said rim bodies to control the axial distance of separation of said sealing rim flanges on said rim bodies to thereby control the bead-to-bead spacing of the tire being cured, said spacer means cooperating with said frame to lock said rim bodies to said frame during a tire curing operation.

2. Tire curing apparatus as defined in claim 1 wherein:
said frame comprises a curing table having upper and lower platens which are vertically spaced apart, and said adjustable spacer means includes;
upper and lower spacer rings adapted to be threadedly carried on the opposite sides of said rim bodies to contact said upper and lower platens.

3. Tire curing apparatus as set forth in claim 1, wherein said sealing rim flanges are removable with respect to said rim bodies whereby sealing rim flanges of different dimensions may be selectively carried by said rim bodies for curing tires of varying sizes.

4. Tire curing apparatus as defined in claim 1 wherein said frame includes upper and lower spiders, and said adjustable spacer means includes a threaded vertical column fixed at its lower end to said lower spider, and extending slidably upwardly through said upper spider, and a nut threadedly carried by the upper portion of said column for engagement with said upper spider.

5. Tire curing apparatus as defined in claim 1, wherein said spring means are interposed between said collar means and said sealing rim flanges.

6. A rim for supporting a vehicle tire during a curing operation, comprising:
(a) a first sealing sleeve member adapted to seal a tire at the bead when the tire is inflated;
(b) a locking sleeve member having opposite ends, comprising a cylindrical outer wall portion and a stop member at one end;
(c) a second sealing sleeve member adapted to seal a tire at the bead opposite from the first sealing sleeve member, said second sealing sleeve member having a cylindrical inner surface;
(d) means for releasably holding said first sealing sleeve member and said locking sleeve member in an oppositely disposed relationship with said locking sleeve member telescoped through said second sealing sleeve member, for support between said first and second sealing sleeve members of a vehicle tire during a curing operation;
(e) means sealing between said first sealing sleeve member and said locking sleeve member; and
(f) an air inlet in said rim, and means sealing between said locking sleeve member and said second sealing sleeve member while permitting axial relative movement therebetween as the tire is inflated so that, the second sealing sleeve member maintains an air-tight seal as the tire is inflated and moves with the expanding tire until blocked by said stop member of said locking sleeve member.

7. A rim for supporting a vehicle tire during a curing operation, the rim comprising:
(a) a first sealing member adapted to engage the tire at a first tire bead;
(b) a locking member, and means for releasably holding said first sealing member and said locking member in an oppositely disposed relationship for support between them of a vehicle tire during a curing operation;
(c) a second sealing member, adapted to engage the tire at a second tire bead, telescopically mounted over said locking member for movement therealong as the tire is inflated, said locking means having stop flange means to limit said movement;
(d) sealing means to provide a seal between said second sealing member and said locking member; and
(e) conduit means for introducing inflating air into the tire, said rim being constructed and arranged so that said when said locking member is in telescopic engagement with said second sealing member and secured by said securing means to said first sealing member and inflating air is introduced into the tire through said conduit means, said first and second sealing members are brought into, or maintained in, sealing relationship with the respective tire beads, and said second sealing member can move with respect to said locking member as the tire is inflated until blocked by said stop flange means.

8. A rim for supporting a vehicle tire during a curing operation, comprising:
(a) a first sealing sleeve member adapted to seal a tire at the bead when the tire is inflated;
(b) an upper sleeve member having opposite ends, comprising a cylindrical outer wall portion and a stop member at one end;
(c) a second sealing sleeve member adapted to seal a tire at the bead opposite from the first sealing sleeve member, said second sealing sleeve member having a cylindrical inner surface;
(d) means for releasably holding said first sealing sleeve member and said upper sleeve member in an oppositely disposed relationship with said upper sleeve member tolescoped through said second sealing sleeve member, for support between said first and second sealing sleeve members of a vehicle tire during a curing operation;
(e) means sealing between said first sealing sleeve member and said upper sleeve member; and
(f) an air inlet in said rim, and means sealing between said upper sleeve member and said second sealing sleeve member while permitting axial relative movement therebetween as the tire is inflated so that, the second sealing sleeve member maintains an air-tight seal as the tire is inflated and moves with the expanding tire until blocked by said stop member of said upper sleeve member.

9. A rim for supporting a vehicle tire during a curing operation, the rim comprising:
(a) a first sealing member adapted to engage the tire at a first tire bead;
(b) an upper member, and means for releasably holding said first sealing member and said upper member in an oppositely disposed relationship and coaxial with a vehicle tire during a curing operation;
(c) a second scaling member, adapted to engage the tire at a second tire bead, telescopically mounted over said upper member for movement therealong as the tire is inflated, said upper member having stop flange means to limit said movement;
(d) sealing means to provide a seal between said second sealing member and said upper member; and
(e) conduit means for introducing inflating air into the tire, said rim being constructed and arranged so that when said upper member is in telescopic engagement with said second sealing member and secured by said securing means to said first sealing member and inflating air is introduced into the tire through said conduit means, said first and second sealing members are brought into, or maintained in, sealing relationship with the respective tire beads, and said second sealing member can move with respect to said upper member as the tire is inflated until blocked by said stop flange means.

* * * * *